United States Patent
Takeda et al.

(10) Patent No.: US 10,723,923 B2
(45) Date of Patent: Jul. 28, 2020

(54) ADHESIVE RESIN LAMINATE, LAMINATE, AND METHOD OF PRODUCING SAME

(71) Applicant: FUJIMORI KOGYO CO., LTD., Tokyo (JP)

(72) Inventors: Toshiyuki Takeda, Tokyo (JP); Nagako Takahashi, Tokyo (JP)

(73) Assignee: FUJIMORI KOGYO CO., LTD., Tokyo (JP)

( * ) Notice: Subject to any disclaimer, the term of this patent is extended or adjusted under 35 U.S.C. 154(b) by 0 days.

(21) Appl. No.: 16/780,914

(22) Filed: Feb. 4, 2020

(65) Prior Publication Data

US 2020/0172776 A1 Jun. 4, 2020

Related U.S. Application Data

(62) Division of application No. 15/891,636, filed on Feb. 8, 2018, now Pat. No. 10,590,317.

(30) Foreign Application Priority Data

Feb. 16, 2017 (JP) .................................. 2017-026762

(51) Int. Cl.
| | |
|---|---|
| C09J 163/04 | (2006.01) |
| B32B 27/08 | (2006.01) |
| C09J 163/00 | (2006.01) |
| C09J 151/06 | (2006.01) |
| B32B 7/12 | (2006.01) |
| C09J 7/10 | (2018.01) |
| C09J 123/14 | (2006.01) |

(52) U.S. Cl.
CPC ............... *C09J 163/04* (2013.01); *B32B 7/12* (2013.01); *B32B 27/08* (2013.01); *C09J 7/10* (2018.01); *C09J 123/14* (2013.01); *C09J 151/06* (2013.01); *C09J 163/00* (2013.01); *C08L 2312/04* (2013.01); *C09J 2201/134* (2013.01); *C09J 2201/36* (2013.01); *C09J 2423/105* (2013.01); *C09J 2451/00* (2013.01); *C09J 2463/00* (2013.01); *C09J 2463/005* (2013.01)

(58) Field of Classification Search
CPC ..................................................... C09J 163/04
See application file for complete search history.

(56) References Cited

FOREIGN PATENT DOCUMENTS

| | | | |
|---|---|---|---|
| JP | 2012-001661 A | 1/2012 | |
| JP | 2012001161 A * | 1/2012 | ......... B60C 11/0309 |

* cited by examiner

*Primary Examiner* — Daniel H Lee
(74) *Attorney, Agent, or Firm* — Hauptman Ham, LLP

(57) ABSTRACT

Provided are an adhesive resin laminate having an excellent adhesive force to two adherends, a laminate in which this adhesive resin laminate is laminated with two adherends, and a method of producing them. An adhesive resin laminate having at least a first adhesive layer and a second adhesive layer, in which the first adhesive layer includes a base resin and a crosslinking agent, the base resin is a modified polyolefin resin, the crosslinking agent is an epoxy-based compound, the second adhesive layer includes a polyolefin-based resin, and the first adhesive layer has a viscoelastic modulus measurement value E (150) at 150° C. of $1.0 \times 10^4$ Pa or more and $1.0 \times 10^8$ Pa or less.

2 Claims, 1 Drawing Sheet

ADHESIVE RESIN LAMINATE, LAMINATE, AND METHOD OF PRODUCING SAME

CROSS-REFERENCE TO RELATED APPLICATIONS

This application is a Divisional of U.S. application Ser. No. 15/891,636 filed Feb. 8, 2018, which claims priority from Japanese Patent Application No. 2017-026762, filed Feb. 16, 2017. The entire teachings of the above applications are incorporated herein by reference.

BACKGROUND OF THE INVENTION

(1) Field of the Invention

The present invention relates to an adhesive resin laminate, a laminate, and a method of producing the same.

(2) Description of Related Art

Conventionally, as a material which adheres to an adherend such as metal, a hot-melt adhesive having an acid-modified polyolefin resin has been known.

For example, Japanese Unexamined Patent Application, First Publication No. 2012-001661 discloses an adhesive resin composition for a polyolefin multilayered film containing a dibasic carboxylic acid anhydride-modified polyolefin resin having a weight average molecular weight of 15,000 to 150,000 and a solid content acid value of 100 to 300, and a multilayer laminated film in which the adhesive resin composition is laminated as an adhesive layer with another resin or metal.

Japanese Unexamined Patent Application, First Publication No. 2012-001661 describes that good adhesiveness to resin or metal or the like can be obtained by using the relevant composition. Certainly, when the adhesive resin composition described in Japanese Unexamined Patent Application, First Publication No. 2012-001661 is used, adhesion between an adhesive layer composed of the adhesive resin composition and an adherend can be improved, depending on the condition. However, when two adherends composed of two different materials are adhered with the adhesive resin composition interposed therebetween, it is difficult to match the condition in order to realize good adhesiveness to both adherends.

SUMMARY OF THE INVENTION

The present invention has been made in view of the above-mentioned circumstances, and an object thereof is to provide an adhesive resin laminate having an excellent adhesive force to two adherends, a laminate in which this adhesive resin laminate is laminated with two adherends, and a method of producing them.

In order to solve the above-mentioned problem, the present invention provides an adhesive resin laminate having at least a first adhesive layer and a second adhesive layer, wherein the first adhesive layer includes a base resin and a crosslinking agent, the base resin is a modified polyolefin resin, the crosslinking agent is an epoxy-based compound, the second adhesive layer includes a polyolefin-based resin, and the first adhesive layer has a viscoelastic modulus measurement value E (150) at 150° C. of $1.0 \times 10^4$ Pa or more and $1.0 \times 10^8$ Pa or less.

The epoxy-based compound contained in the first adhesive layer may be a phenol novolak-type epoxy resin.

The epoxy-based compound contained in the first adhesive layer may include a bisphenol A skeleton.

The second adhesive layer may be a laminate of a plurality of polyolefin-based resin layers.

The second adhesive layer may include a layer including block polypropylene.

The second adhesive layer has a film thickness five times or more of a film thickness of the first adhesive layer, and the second adhesive layer may have a support property.

Also, the present invention provides a laminate including the adhesive resin laminate and two adherends, the adhesive resin laminate and two adherends being laminated in an order of a first adherend, the first adhesive layer of the adhesive resin laminate, the second adhesive layer of the adhesive resin laminate, and a second adherend.

The first adherend may be metal, and the second adherend may be selected from any one of a polyolefin resin, a polyamide resin, and a polyester resin.

Also, the present invention provides a method of producing the adhesive resin laminate, the method comprising (1) a step of dissolving the modified polyolefin resin and the epoxy-based compound in a solvent to produce a coating liquid; (2) a step of coating the coating liquid on a substrate film and drying the coating liquid to produce the first adhesive layer; (3) a step of obtaining the second adhesive layer having a film shape by extrusion molding; (4) a step of laminating the first adhesive layer on the substrate film and the second adhesive layer; and (5) a step of peeling the substrate film to obtain the adhesive resin laminate, in this order.

Also, the present invention provides a method of producing the laminate, the method comprising (1) a first step of laminating the first adherend and the first adhesive layer and heat-pressing the first adherend and the first adhesive layer to laminate the first adherend and the adhesive resin laminate; and (2) a step of laminating the second adherend and the second adhesive layer and heat-pressing the second adherend and the second adhesive layer at a temperature higher than a temperature in the first step by 30° C. or higher to laminate the second adherend and the adhesive resin laminate, in this order.

According to the present invention, there can be provided an adhesive resin laminate having an excellent adhesive force to two adherends, a laminate in which this adhesive resin laminate is laminated with two adherends, and a method of producing them.

DETAILED DESCRIPTION OF THE INVENTION

The present invention will be illustrated below based on a preferred embodiment.

Figure 1:
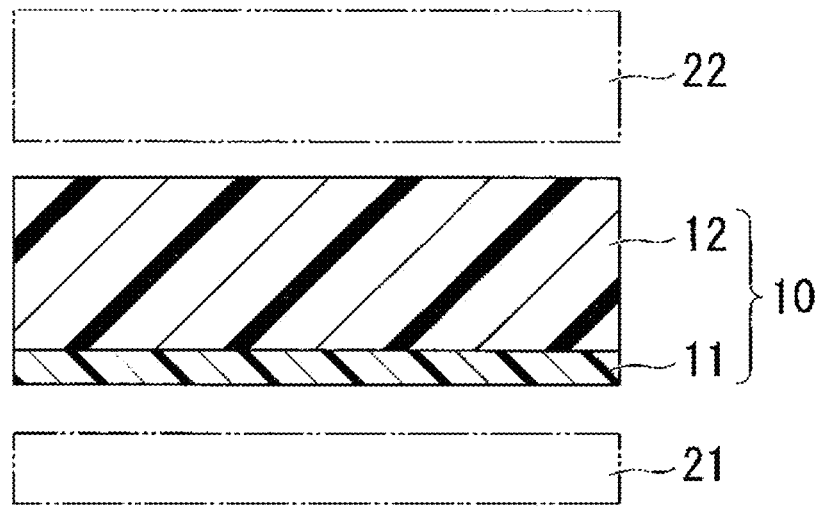
FIG. 1 is a cross-sectional view schematically showing an adhesive resin laminate of the present invention and two adherends.

FIG. 1 schematically shows an adhesive resin laminate of the present embodiment. An adhesive resin laminate 10 is a laminate having at least a first adhesive layer 11 and a second adhesive layer 12. The first adhesive layer 11 has a surface which can be in contact with a first adherend 21. The second adhesive layer 12 has a surface which can be in contact with a second adherend 22.

The first adhesive layer 11 includes a base resin composed of a modified polyolefin resin and a crosslinking agent which crosslinks the base resin. In the first adhesive layer 11, a part or all of the base resin and a part or all of the crosslinking agent may have been reacted. A part or all of the base resin and a part or all of the crosslinking agent may have been unreacted. In the first adhesive layer 11, the base resin may include a crosslinked resin in which the base resin has been crosslinked with the crosslinking agent.

Examples of the modified polyolefin resin to be the base resin of the first adhesive layer 11 include one or two or more of an acid-modified polyolefin resin, a hydroxy-modified polyolefin resin, a chlorinated polyolefin resin, and the like. Inter alia, from the viewpoint of reactivity with an epoxy group, an acid-modified polyolefin resin which has been modified with unsaturated carboxylic acid or a derivative thereof is preferred.

Examples of a method of producing the acid-modified polyolefin resin include a method of graft-modifying an unmodified polyolefin resin with an acid functional group-containing monomer by melting and kneading them, a method of copolymerizing an olefin monomer and an acid functional group-containing monomer, and the like. As the base resin of the first adhesive layer 11, the acid-modified polyolefin resin which is obtained by graft modification is preferred. It is preferable that graft modification is performed in the presence of a radical polymerization initiator such as organic peroxide or an aliphatic azo compound.

In a constitution of the acid-modified polyolefin resin, examples of an olefin monomer when copolymerized with the acid functional group-containing monomer, or an olefin monomer constituting the unmodified polyolefin resin include one or two or more of ethylene, propylene, 1-butene, isobutylene, 1-hexene, 1-octene, α-olefin, and the like.

Examples of the unmodified polyolefin resin before graft modification include one or two or more of polyethylene, polypropylene, poly-1-butene, polyisobutylene, a copolymer of ethylene and propylene, a copolymer of propylene and 1-butene, a random copolymer of propylene and ethylene or α-olefin, a block copolymer of propylene and ethylene or α-olefin, and the like. Inter alia, a polypropylene-based resin such as homopolypropylene which is a homopolymer of propylene, a block copolymer of propylene-ethylene, a random copolymer of propylene-ethylene or a copolymer of propylene-1-butene is preferred.

Molecular motion during heating of the first adhesive layer 11 is promoted when a monomer constituting the acid-modified polyolefin resin contains 1-butene. When the base resin and the crosslinking agent have functional groups which can be reacted with each other, an opportunity that the functional groups of the base resin and those of the crosslinking agent are in contact with each other is increased, and as a result, durability of the first adhesive layer 11 and adherence to an adherend are more improved.

The acid functional group-containing monomer is a compound having an ethylenic double bond and an acid group or an acid anhydride group in the same molecule. Examples of the acid group or the acid anhydride group to be an acid functional group include a carboxylic acid group (—COOH) and a carboxylic acid anhydride group (—CO—O—CO—). Examples of a monomer having the carboxylic acid group or the carboxylic acid anhydride group include one or two or more of unsaturated monocarboxylic acid, unsaturated dicarboxylic acid, unsaturated dicarboxylic acid anhydride, and the like.

In one or two or more of the acid-modified polyolefin resins, the same acid functional group-containing monomer may be used, or different two or more acid functional group-containing monomers may be used.

Examples of the unsaturated monocarboxylic acid include one or two or more of α,β-unsaturated carboxylic acid monomers such as acrylic acid, methacrylic acid, crotonic acid, and isocrotonic acid.

Examples of the unsaturated dicarboxylic acid include one or two or more of α,β-unsaturated dicarboxylic acids such as maleic acid, itaconic acid, citraconic acid, and fumaric acid, tetrahydrophthalic acid, methyltetrahydrophthalic acid, 5-norbornene-2,3-dicarboxylic acid (nadic acid), endo-bicyclo[2.2.1]-5-heptene-2,3-dicarboxylic acid (endic acid), and the like.

Examples of the unsaturated dicarboxylic acid anhydride include one or two or more of maleic acid anhydride, itaconic acid anhydride, citraconic acid anhydride, tetrahydrophthalic acid anhydride, methyltetrahydrophthalic acid anhydride, nadic acid anhydride, endic acid anhydride, and the like.

As the acid-modified polyolefin resin, due to high reactivity with an epoxy group contained in the crosslinking agent, an acid-modified polyolefin resin having an acid anhydride group is preferred, an acid-modified polyolefin resin having a carboxylic acid anhydride group is preferred, and a maleic acid anhydride-modified polyolefin resin is particularly preferred. Inter alia, from the viewpoint of adhesiveness and a moderate melting point, a maleic acid anhydride-modified polypropylene-based resin is preferred.

When the acid-modified polyolefin resin contains an unreacted acid functional group-containing monomer, an adhesive force may be reduced. For this reason, as the base resin of the first adhesive layer 11, an acid-modified polyolefin resin that does not include an unreacted acid functional group-containing monomer is preferred. An acid-modified polyolefin resin from which an unreacted acid functional group-containing monomer has been removed may be used as the base resin.

In the acid-modified polyolefin resin, the proportion of a part derived from an unmodified polyolefin resin or olefin monomer is preferably 50 parts by mass or more based on 100 parts by mass of a total amount of the acid-modified polyolefin resin.

A melting point of the acid-modified polyolefin resin is preferably 50° C. to 100° C. This melting point is preferably 60° C. to 98° C., more preferably 70° C. to 98° C., and further preferably 75° C. to 95° C. From the viewpoint of solubility in a solvent and aging after lamination, a low melting point is preferred, and from the viewpoint of heat resistance and durability, a high melting point is preferred.

A molecular weight of the acid-modified polyolefin resin is not particularly limited, but is, for example, 10,000 to 800,000, preferably 50,000 to 650,000, more preferably 80,000 to 550,000, and further preferably 100,000 to 450,000.

Then, the crosslinking agent of the first adhesive layer 11 will be illustrated. Examples of an epoxy-based compound to be the crosslinking agent include a bisphenol A-type epoxy resin, a bisphenol F-type epoxy resin, a phenol novolak-type epoxy resin, a glycidyl ether-type epoxy resin, a glycidyl amine-type epoxy resin, and the like. A phenoxy resin is generally used as a polyhydroxypolyether resin, but when a phenoxy resin has an epoxy group derived from a raw material, it can be used as an epoxy-based compound of the crosslinking agent.

A bisphenol-type epoxy resin such as a bisphenol A-type epoxy resin or a bisphenol F-type epoxy resin is a compound in which a basic structure is a bisphenol compound and an epoxy group has been introduced into a part of the structure. Since the bisphenol compound has two phenolic hydroxy groups, the bisphenol-type epoxy resin usually becomes a bifunctional epoxy resin having a bisphenol skeleton.

In the present specification, the phenol novolak-type epoxy resin is a compound in which a basic structure is a phenol novolak resin and an epoxy group has been introduced into a part of the structure. The phenol novolak resin is generally also referred to as "novolak" simply and is obtained by condensing a phenol compound and formaldehyde. An amount of an epoxy group introduced per one molecule in the phenol novolak-type epoxy resin is not particularly limited. Since a number of epoxy groups are introduced into phenolic hydroxy groups which exist at a large number in the phenol novolak resin by reacting an epoxy group raw material such as epichlorohydrin and the phenol novolak resin, the phenol novolak-type epoxy resin usually becomes a polyfunctional epoxy resin.

The phenol compound constituting the phenol novolak resin may be a compound having a phenolic hydroxy group, and a compound having no active hydrogen other than a hydroxy group is preferred. Specific examples of the phenol compound include monophenol compounds such as phenol (hydroxybenzene), cresol, and naphthol; bisphenol compounds such as bisphenol A, bisphenol E, and bisphenol F; and the like. The phenol novolak resin and the phenol novolak-type epoxy resin which include the bisphenol compound have a bisphenol skeleton.

One example of the phenol novolak-type epoxy resin having a bisphenol skeleton is shown in the formula (1).

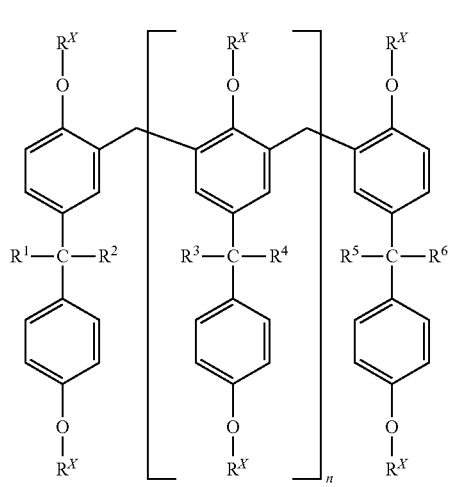

(1)

In the formula (1), $R^1$ to $R^6$ each are independently a hydrogen atom or an organic group such as a methyl group, and n is an integer of 0 to 10. $R^X$s are groups having an epoxy group. $R^X$s may be the same or different, respectively. When n is an integer of 2 or more, $R^3$ and $R^4$ may be the same or different, respectively.

Examples of the organic group when $R^1$ to $R^6$ are not a hydrogen atom include hydrocarbon groups such as a methyl group, an ethyl group, and a phenyl group, and halogen-substituted hydrocarbon groups such as a trifluoromethyl group. Inter alia, a methyl group is preferred.

Examples of the group having an epoxy group represented by $R^X$ include an aliphatic group having an epoxy group, an alicyclic group having an epoxy group, an aromatic group having an epoxy group, and the like. Inter alia, a glycidyl group (another name 2,3-epoxypropyl group) is preferred.

As the epoxy-based compound to be the crosslinking agent, the phenol novolak-type epoxy resin having the bisphenol skeleton is preferred, and the phenol novolak-type epoxy resin having a bisphenol A skeleton is particularly preferred.

For example, in the resin represented by the formula (1) becomes a resin having a bisphenol A skeleton by satisfying at least one selected from (i) both of $R^1$ and $R^2$ are methyl groups, (ii) both of at least one set of $R^3$ and $R^4$ binding to the same carbon atom are methyl groups, and (iii) both of $R^5$ and $R^6$ are methyl groups.

An epoxy equivalent of the epoxy-based compound is preferably 100 to 300 and more preferably 200 to 300. The epoxy equivalent (g/eq) corresponds to a molecular weight of the epoxy-based compound per one epoxy group, and it means that as this value is smaller, the number of epoxy groups in the epoxy-based compound is larger. By using the epoxy-based compound having a relatively small epoxy equivalent as the crosslinking agent, adhesiveness between the first adhesive layer 11 and the first adherend 21 becomes good, and the acid-modified polyolefin resin of the base resin is sufficiently crosslinked even when an addition amount of the epoxy-based compound is relatively small.

As specific examples of the phenol novolak-type epoxy resin, commercial products such as jER (registered trademark) 154, jER (registered trademark) 157S70, and jER (registered trademark) 157S65 manufactured by Mitsubishi Chemical Corporation; EPICLON (registered trademark) N-730A, EPICLON (registered trademark) N-740, EPICLON (registered trademark) N-770, and EPICLON (registered trademark) N-775 manufactured by DIC CORPORATION (all of the above are product names); and the like can also be used.

It is conceivable that in the first adhesive layer 11, it is possible to exert excellent adhesiveness to various adherends such as metals, glasses, and plastics, when both of an acid functional group of the base resin and an epoxy group of the crosslinking agent function as an adhesive functional group to the first adherend. It is conceivable that the strength of the resin is reinforced and good durability together with excellent adhesiveness is obtained, when a part of an acid functional group of the base resin and a part of an epoxy group of the crosslinking agent are reacted to form a crosslinked structure of the base resin and the crosslinking agent.

A crosslinking reaction between a part of an acid functional group of the base resin and a part of an epoxy group of the crosslinking agent may progress during any one or more steps of: a step of forming the first adhesive layer 11; a step of laminating the first adhesive layer 11 and the second adhesive layer 12; a step of laminating the first adhesive layer 11 and the first adherend 21; a step of aging after lamination of an adherend; and the like.

An adhesive composition constituting the first adhesive layer 11 can appropriately contain a miscible additive, an additional resin, a plasticizer, a stabilizer, a coloring agent, and the like as desired in addition to the adhesive resin composed of the base resin and the crosslinking agent.

The ratio of 0.01 to 30 parts by mass of the crosslinking agent to 70 to 99.99 parts by mass of the base resin is preferable, letting a total amount of adhesive resin components in the first adhesive layer 11 to be 100 parts by mass. The ratio of 0.1 to 20 parts by mass of the crosslinking agent to 80 to 99.9 parts by mass of the base resin is more preferable.

If the ratio of the crosslinking agent is too large, it may be difficult to set the appropriate adhesion condition. If the crosslinking agent is not contained, adhesiveness to the first adherend 21 becomes deteriorated.

Examples of a method of forming the first adhesive layer 11 include a method of producing a coating liquid including the base resin and the crosslinking agent, coating the coating liquid on a substrate film, and drying the coating liquid. Thereby, it becomes possible to form the first adhesive layer 11 as a thinner layer, and it is possible to reduce the first adhesive layer 11 and a laminate including the first adhesive layer 11 in thickness.

A film thickness of the first adhesive layer 11 after drying corresponds to a film thickness of the first adhesive layer 11 in the adhesive resin laminate 10. Examples of the film thickness of the first adhesive layer 11 include 0.1 to 50 µm. The film thickness is preferably 0.5 to 10 µm and more preferably 0.7 to 5 µm. When the film thickness of the first adhesive layer 11 is too large, workability on lamination with an adherend may be reduced.

As the coating liquid, a coating liquid which is obtained by dissolving the base resin and the crosslinking agent in a solvent is preferred. As the solvent, an organic solvent excellent in drying property after coating in addition to solubility of the base resin and the crosslinking agent is preferred. A boiling point of the solvent is preferably, for example, 150° C. or lower. Specific examples of the solvent include one or two or more of aromatic solvents such as toluene, xylene, anisole, ethyl benzyl ether, cresyl methyl ether, diphenyl ether, dibenzyl ether, phenetol, butyl phenyl ether, ethylbenzene, diethylbenzene, pentylbenzene, isopropylbenzene, cymene, and mesitylene; aliphatic solvents such as n-hexane; ketone-based solvents such as acetone, methyl ethyl ketone, cyclohexanone, methyl-n-pentyl ketone, methyl isopentyl ketone, and 2-heptanone; ester-based solvents such as methyl lactate, ethyl lactate, methyl acetate, ethyl acetate, butyl acetate, methyl pyruvate, ethyl pyruvate, methyl methoxypropionate, and ethyl ethoxypropionate; alcohol-based solvents such as methanol, ethanol, isopropyl alcohol, ethylene glycol, diethylene glycol, propylene glycol, and dipropylene glycol; and the like.

As the solvent used in the coating liquid, one may be used alone, or a mixed solvent as a combination of two or more thereof may be used. In the case of the mixed solvent, it is also preferable to use an organic solvent which dissolves the base resin well, together with an organic solvent which dissolves the crosslinking agent well in combination. As such a combination, a combination of toluene which dissolves the base resin well and methyl ethyl ketone which dissolves the crosslinking agent well is preferred. In a method of producing the coating liquid including the mixed solvent, the base resin and the crosslinking agent may be dissolved in the mixed solvent, or a solution of the base resin and a solution of the crosslinking agent may be mixed.

The mixing ratio in the mixed solvent is not particularly limited, but for example, when toluene and methyl ethyl ketone are combined, the mixing ratio is preferably in a mass ratio of 60 to 95:5 to 40 and more preferably 70 to 90:10 to 30.

Then, the second adhesive layer 12 will be illustrated. The second adhesive layer 12 is a layer composed of a polyolefin-based resin. The second adhesive layer 12 may be of a monolayer structure, or may be of a multilayer structure. Examples of the multilayer structure include a laminate of a plurality of polyolefin-based resin layers.

Examples of the polyolefin-based resin constituting the second adhesive layer 12 include one or two or more of polyethylene, polypropylene, poly-1-butene, polyisobutylene, a copolymer of ethylene and propylene, a copolymer of propylene and 1-butene, a random copolymer of propylene and ethylene or α-olefin, a block copolymer of propylene and ethylene or α-olefin, and the like. Inter alia, polypropylene-based resins such as homopolypropylene which is a homopolymer of propylene (hereinafter, may be referred to as "homopolypropylene"), a block copolymer of propylene-ethylene (hereinafter, may be referred to as "block polypropylene"), and a random copolymer of propylene-ethylene (hereinafter, may be referred to as "random polypropylene") are preferred.

It is preferable that the second adhesive layer 12 includes a layer composed of block polypropylene, due to excellent mechanical strength.

It is preferable that the second adhesive layer 12 has a support property. For example, when the second adhesive layer 12 single body can be conveyed as a base film or the like with a coating apparatus, a lamination apparatus or the like, the second adhesive layer 12 has a support property.

It is preferable that the second adhesive layer 12 includes a layer composed of random polypropylene on a surface being in contact with the first adhesive layer 11, due to excellent adhesiveness with the first adhesive layer 11.

Examples of a film thickness of the second adhesive layer 12 include 1 to 200 µm. The film thickness is preferably 5 to 100 µm and more preferably 10 to 50 µm. It is preferable that the film thickness of the second adhesive layer 12 is five times or more of the film thickness of the first adhesive layer 11. By reducing the first adhesive layer 11 in thickness, interlayer peeling to the first adherend 21 can be suppressed. By increasing the second adhesive layer 12 in thickness, the support property of the second adhesive layer 12 can be improved.

In the adhesive resin laminate 10 of the present embodiment, the first adhesive layer 11 has a viscoelastic modulus measurement value E (150) at 150° C. of preferably $1.0 \times 10^4$ Pa or more and $1.0 \times 10^8$ Pa or less. A chart of a storage elastic modulus E' of the first adhesive layer 11 preferably shows a chart from a glassy state in a low temperature region to an equilibrium region where a measurement value E' becomes an approximately equilibrium value via a transition region where the measurement value E' gradually reduces, with a temperature rise. Thereby, a temperature at which the first adhesive layer 11 adheres to the first adherend 21 is apt to be low. As a result, it becomes easy to sequentially perform a step of adhering the second adhesive layer 12 to the second adherend 22 after the first adhesive layer 11 has adhered to the first adherend 21. The value E (150) can be adjusted by a modification amount of the modified polyolefin resin of the base resin in the resin composition constituting the first adhesive layer 11 and an addition amount of the crosslinking agent.

The viscoelastic modulus measurement value E (150) of the first adhesive layer 11 can be evaluated, for example, by measuring the storage elastic modulus at 150° C. using a publicly known dynamic viscoelasticity measuring apparatus. As the dynamic viscoelasticity measuring apparatus, a dynamic viscoelasticity measuring apparatus "RSA-3" (product name) of TA Instruments or the like can be used. A vibration frequency when the storage elastic modulus is measured is, for example, 1 Hz.

Examples of a method of producing the adhesive resin laminate 10 include a method comprising: (1) a step of dissolving a modified polyolefin resin and an epoxy-based compound in a solvent to produce a coating liquid; (2) a step of coating the coating liquid on a substrate film and drying the coating liquid to produce the first adhesive layer 11; (3) a step of obtaining the second adhesive layer 12 having a film shape by extrusion molding; (4) a step of laminating the first adhesive layer 11 on the substrate film, and the second adhesive layer 12; and (5) a step of peeling the substrate film to obtain the adhesive resin laminate 10; in this order.

The coating of the coating liquid is as described above. The substrate film is not particularly limited, but examples thereof include resin films poor in adhesiveness such as a film of a polyester resin such as polyethylene terephthalate (PET) or polyethylene naphthalate (PEN); and a fluorine resin film A substrate film which has been subjected to release treatment may be used. Examples of a releasing agent include a silicone-based releasing agent, a fluorine-based releasing agent, a long chain alkyl-based releasing agent, and the like.

Examples of a method of adhering the adhesive resin laminate 10 to the first adherend 21 and the second adherend 22 include a method including (1) a first step of laminating the first adherend 21 and the first adhesive layer 11, and heat-pressing them to laminate the first adherend 21 and the adhesive resin laminate 10, and (2) a step of laminating the second adherend 22 and the second adhesive layer 12, and heat-pressing them at a temperature higher than a temperature of the first step by 30° C. or higher to laminate the second adherend 22 and the adhesive resin laminate 10, in this order.

Thereby, a laminate is obtained in which the adhesive resin laminate 10 and two adherends 21 and 22 are laminated in an order of the first adherend 21, the first adhesive layer 11 and the second adhesive layer 12 of the adhesive resin laminate 10, and the second adherend 22.

Examples of a material constituting the first adherend 21 include metals such as aluminum, copper, lead, zinc, iron, nickel, titanium, chromium, stainless, and alloy. Due to easy formation of a laminate with the adhesive resin laminate 10, it is preferable that the first adherend 21 is a metal foil. A thickness of the metal foil is preferably 100 μm or less, more preferably 5 to 40 μm, further preferably 10 to 30 μm, and particularly preferably 10 to 20 μm.

Examples of a material constituting the second adherend 22 include synthetic resins composed of polyolefin resins such as oriented polypropylene (OPP); polyamide resins such as nylon (Ny); polyester resins such as polyethylene terephthalate (PET), polyethylene naphthalate (PEN), and polybutylene terephthalate (PBT); polyether ether ketone (PEEK), polyphenylene sulfide (PPS), and the like. Due to easy formation of a laminate with the adhesive resin lami-nate 10, the second adherend 22 is preferably a synthetic resin film A thickness of the synthetic resin film is, for example, 1 to 50 μm. The synthetic resin film may be of a monolayer structure, or of a multilayer structure.

As mentioned above, the present invention has been illustrated based on a preferred embodiment, but the present invention is not limited to the above-mentioned embodiment, and various alterations can be made in a range not departing from the subject matter of the present invention.

By preparing two adhesive resin laminates 10 and laminating them so that the second adhesive layer 12 is arranged inward, a laminate including the first adhesive layer 11, the second adhesive layer 12, the second adhesive layer 12, and the first adhesive layer 11 in this order may be formed. In this case, adhesiveness of both surfaces is high because of the first adhesive layer 11, and adhesiveness between respective layers also becomes good.

Examples

The present invention will be specifically illustrated below by way of Examples, but the present invention is not limited by Examples.

According to a constitution shown in Table 1, the first adhesive layer 11 was produced. Specifically, a solution of a maleic acid anhydride-modified polypropylene-based resin and a phenol novolak-type epoxy resin in toluene was coated with a bar coater on a PET substrate film which had been subjected to release treatment, and the coating solution was dried.

TABLE 1

| | Base resin | | Crosslinking agent | | First adhesive layer | |
|---|---|---|---|---|---|---|
| | Material | Addition amount (parts by mass) | Material | Addition amount (part(s) by mass) | Film thickness (μm) | E (150) (Pa) |
| Adhesive layer 1-1 | Base resin A | 90 | Crosslinking agent A | 1 | 2.0 | 6.0E+05 |
| Adhesive layer 1-2 | Base resin A | 95 | Crosslinking agent A | 5 | 2.0 | 5.0E+05 |
| Adhesive layer 1-3 | Base resin A | 80 | Crosslinking agent A | 20 | 2.0 | 1.2E+07 |
| Adhesive layer 1-4 | Base resin A | 60 | Crosslinking agent A | 40 | 2.0 | 1.5E+07 |
| Adhesive layer 1-5 | Base resin A | 95 | Crosslinking agent B | 5 | 2.0 | 3.0E+05 |
| Adhesive layer 1-6 | Base resin A | 95 | Crosslinking agent C | 5 | 2.0 | 7.0E+05 |
| Adhesive layer 1-7 | Base resin A | 100 | None | 0 | 2.0 | <1.0E+04 |
| Adhesive layer 1-8 | Base resin A | 90 | Phenoxy resin | 10 | 2.0 | <1.0E+04 |
| Adhesive layer 1-9 | Base resin B | 90 | Crosslinking agent A | 10 | 2.0 | 4.0E+05 |
| Adhesive layer 1-10 | Base resin A | 95 | Crosslinking agent A | 5 | 10.0 | 5.2E+05 |

In Table 1, the "base resin A" represents a maleic acid anhydride-modified propylene-1-butene copolymer. The "base resin B" represents maleic acid anhydride-modified polypropylene.

The "crosslinking agent A", the "crosslinking agent B", and the "crosslinking agent C" represent different kinds of phenol novolak-type epoxy resins, respectively. Specifically, a bisphenol A-type compound in which all of $R^1$ to $R^6$ are methyl groups in the above-mentioned formula (1) is the "crosslinking agent A". A bisphenol E-type compound in which $R^1$, $R^3$, and $R^5$ are methyl groups, and $R^2$, $R^4$, and $R^6$ are hydrogen atoms is the "crosslinking agent B". A bisphenol F-type compound in which all of $R^1$ to $R^6$ are hydrogen atoms is the "crosslinking agent C".

The "phenoxy resin" is one kind of an epoxy-based compound which has a bisphenol skeleton, but is not a novolak-type.

Figure 2:
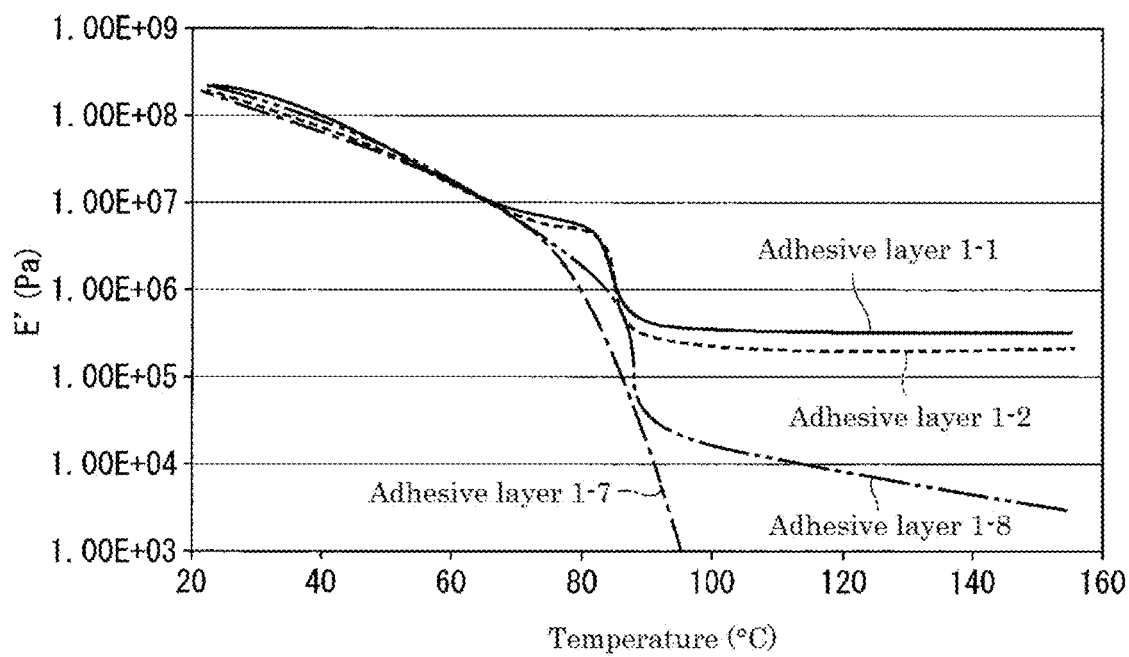
FIG. 2 is a graph exemplifying storage elastic modulus measurement results of a first adhesive layer.

The value E (150) was expressed, for example, so that "$1.0 \times 10^4$" represents "1.0E+04". The measurement results of the storage elastic modulus E' (Pa) of the adhesive layer 1-1, the adhesive layer 1-2, the adhesive layer 1-7, and the adhesive layer 1-8 are exemplified in the graph of FIG. 2. A value E' at 150° C. corresponds to E (150).

According to a constitution shown in Table 2, the second adhesive layer 12 was produced by extrusion film formation or multilayer extrusion film formation.

adhesive layer 11 and the first adherend 21, and then the second adhesive layer 12 and the second adherend 22 were stuck in this order was produced.

The sequential stable production property was evaluated at n=5 by repeating five times the work of sticking the first adhesive layer 11 and the first adherend 21, and the second adhesive layer 12 and the second adherend 22 in this order, respectively. For evaluation criteria, the case where the work could be performed without a problem all five times was evaluated as "⊙", the case where a fish eye was generated

TABLE 2

|  | First layer | | | Second layer | | | Third layer | | | Second adhesive layer | |
| --- | --- | --- | --- | --- | --- | --- | --- | --- | --- | --- | --- |
|  | Material | Melting point (° C.) | Film thickness (μm) | Material | Melting point (° C.) | Film thickness (μm) | Material | Melting point (° C.) | Film thickness (μm) | Film thickness (μm) | T2 (° C.) |
| Adhesive layer 2-1 | r-PP | 130 | 10 | b-PP | 150 | 20 | r-PP | 130 | 10 | 40 | 130 |
| Adhesive layer 2-2 | r-PP | 130 | 40 |  | None |  |  | None |  | 40 | 130 |
| Adhesive layer 2-3 | b-PP | 150 | 40 |  | None |  |  | None |  | 40 | 150 |

In Table 2, "r-PP" represents random polypropylene and "b-PP" represents block polypropylene. When the second adhesive layer 12 is constituted of a multilayer structure, a side being in contact with the second adherend 22 is set as a "first layer", and a "second layer" and a "third layer" are set in order in the first adhesive layer 11 side.

Then, after lamination of the first adhesive layer 11 on a PET substrate film which had been subjected to release treatment and the second adhesive layer 12 according to a combination shown in Table 3, the PET substrate film which had been subjected to release treatment was peeled to obtain the adhesive resin laminate 10.

in one time to two times of the work was evaluated as "Δ", and the case where a fish eye was generated three or more times was evaluated as "x".

After aging was performed at 60° C. for 5 days after production of the above-mentioned laminate, the adhesiveness of the adhesive resin laminate 10 was measured using a sample which was obtained by cutting the resulting laminate into a width of 15 mm. The average adhesive strength (N/15 mm) at the time when each sample was peeled by T-shape peeling at a speed of 50 mm/min under an environment of a temperature of 90° C. was measured. The case where the average adhesive strength was 10 N/15 mm

TABLE 3

|  | First adhesive layer | Second adhesive layer | E (150) (Pa) | Adhesiveness with first adherend | Adhesiveness with second adherend | Sequential stable production property | Comprehensive evaluation |
| --- | --- | --- | --- | --- | --- | --- | --- |
| Example 1 | Adhesive layer 1-1 | Adhesive layer 2-1 | 6.0E+05 | ⊙ | ○ | ○ | ⊙ |
| Example 2 | Adhesive layer 1-2 | Adhesive layer 2-1 | 5.0E+05 | ⊙ | ○ | ○ | ⊙ |
| Example 3 | Adhesive layer 1-3 | Adhesive layer 2-1 | 1.2E+07 | ○ | ○ | ○ | ○ |
| Example 4 | Adhesive layer 1-4 | Adhesive layer 2-1 | 1.5E+07 | Δ | ○ | ○ | Δ |
| Example 5 | Adhesive layer 1-5 | Adhesive layer 2-1 | 3.0E+05 | ⊙ | ○ | ○ | ⊙ |
| Example 6 | Adhesive layer 1-6 | Adhesive layer 2-1 | 7.0E+05 | ⊙ | ○ | ○ | ⊙ |
| Comparative Example 1 | Adhesive layer 1-7 | Adhesive layer 2-1 | <1.0E+04 | X | ○ | X | X |
| Comparative Example 2 | Adhesive layer 1-8 | Adhesive layer 2-1 | <1.0E+04 | X | ○ | X | X |
| Example 7 | Adhesive layer 1-9 | Adhesive layer 2-1 | 4.0E+05 | ○ | ○ | ○ | ○ |
| Example 8 | Adhesive layer 1-10 | Adhesive layer 2-1 | 5.2E+05 | ○ | ○ | Δ | Δ |
| Example 9 | Adhesive layer 1-3 | Adhesive layer 2-2 | 1.2E+07 | ○ | Δ | ○ | Δ |
| Example 10 | Adhesive layer 1-3 | Adhesive layer 2-3 | 1.2E+07 | ○ | ○ | ○ | ○ |
| Comparative Example 3 | Adhesive layer 1-3 | None | 1.2E+07 | ○ | ○ | X | X |
| Comparative Example 4 | None | Adhesive layer 2-1 | None | X | ○ | X | X |

The first adhesive layer 11 of the adhesive resin laminate 10 and a plate of aluminum as the first adherend 21 were overlapped and stuck while a pressure of 0.25 MPa and heat at 100° C. were applied. Then, the second adhesive layer 12 on a surface on an opposite side of the adhesive resin laminate and a PET film as the second adherend 22 which had not been subjected to release treatment were overlapped, and a pressure of 0.25 MPa and heat at 160° C. were applied to stick them, and thereby, a laminate in which the first or more was evaluated as "⊙", the case where the average adhesive strength was 5 N/15 mm or more and less than 10 N/15 mm was evaluated as "○", the case where the average adhesive strength was 2 N/15 mm or more and less than 5 N/15 mm was evaluated as "Δ", and the case where the average adhesive strength was less than 2 N/15 mm was evaluated as "x".

The comprehensive evaluation was performed based on evaluation of 3 items including the workability of the adhesive resin laminate 10, the adhesiveness with the first adherend 21, and the adhesiveness with the second adherend 22.

The comprehensive evaluation in the case where one or more items included "⊙" and other items also included "○" was evaluated as "⊙".

The comprehensive evaluation in the case where all of 3 items included "○" was evaluated as "○".

The comprehensive evaluation in the case where 2 items included "○" and one item included "Δ" was evaluated as "Δ".

The comprehensive evaluation in the case where even one item included "x" was evaluated as "x".

Each of the adhesive resin laminates 10 of Examples 1 to 10 had a comprehensive evaluation of "⊙", "○" or "Δ". With regard to Examples each having a comprehensive evaluation of "○" or "Δ", it is conceivable that such an evaluation is given because E (150) is slightly large in Examples 3 and 4, because a resin of the base resin is different from that of other Examples in Example 7, because a film thickness of the first adhesive layer 11 is slightly large in Example 8, and because the crosslinking agent is different from that of other Examples in Examples 9 and 10.

Additionally, the comprehensive evaluations of Comparative Examples 1 and 2 in each of which the first adhesive layer 11 had a viscoelastic modulus measurement value E (150) of less than $1.0 \times 10^4$ Pa were evaluated as "x".

In Comparative Example 1, the crosslinking agent is not used in the first adhesive layer 11.

The comprehensive evaluation of Comparative Example 3 in which the adhesive resin laminate 10 was composed only of the first adhesive layer 11 was evaluated as "x".

The comprehensive evaluation of Comparative Example 4 in which the adhesive resin laminate 10 was composed only of the second adhesive layer 12 was evaluated as "x".

DESCRIPTION OF THE REFERENCE NUMERALS

10: Adhesive resin laminate
11: First adhesive layer
12: Second adhesive layer
21: First adherend
22: Second adherend

What is claimed is:

1. A method of producing an adhesive resin laminate having at least a first adhesive layer and a second adhesive layer, wherein said first adhesive layer comprises a base resin and a crosslinking agent, said base resin is a modified polyolefin resin and said crosslinking agent is an epoxy-based compound, said second adhesive layer comprises a polyolefin-based resin, and said first adhesive layer has a viscoelastic modulus measurement value E (150) at 150° C. of $1.0 \times 10^4$ Pa or more and $1.0 \times 10^8$ Pa or less, the method comprising:
(1) a step of dissolving said modified polyolefin resin and said epoxy-based compound in a solvent to produce a coating liquid;
(2) a step of coating said coating liquid on a substrate film and drying the coating liquid to produce said first adhesive layer;
(3) a step of obtaining said second adhesive layer having a film shape by extrusion molding;
(4) a step of laminating said first adhesive layer on said substrate film and said second adhesive layer; and
(5) a step of peeling said substrate film to obtain said adhesive resin laminate, in this order.

2. A method of producing a laminate comprising an adhesive resin laminate having at least a first adhesive layer and a second adhesive layer; and first and second adherends, said adhesive resin laminate and said first and second adherends being laminated in an order of the first adherend, said first adhesive layer of said adhesive resin laminate, said second adhesive layer of said adhesive resin laminate, and the second adherend, wherein said first adhesive layer comprises a base resin and a crosslinking agent, said base resin is a modified polyolefin resin and said crosslinking agent is an epoxy-based compound, said second adhesive layer comprises a polyolefin-based resin, and said first adhesive layer has a viscoelastic modulus measurement value E (150) at 150° C. of $1.0 \times 10^4$ Pa or more and $1.0 \times 10^8$ Pa or less, the method comprising:
(1) a first step of laminating said first adherend and said first adhesive layer and heat-pressing said first adherend and said first adhesive layer to laminate said first adherend and said adhesive resin laminate; and
(2) a step of laminating said second adherend and said second adhesive layer and heat-pressing said second adherend and said second adhesive layer at a temperature higher than a temperature in said first step by 30° C. or more to laminate said second adherend and said adhesive resin laminate, in this order.

* * * * *